March 2, 1954     K. R. DAVIES ET AL     2,670,599
FUEL SYSTEM FOR GAS-TURBINE ENGINES
Filed Oct. 20, 1949     7 Sheets-Sheet 1
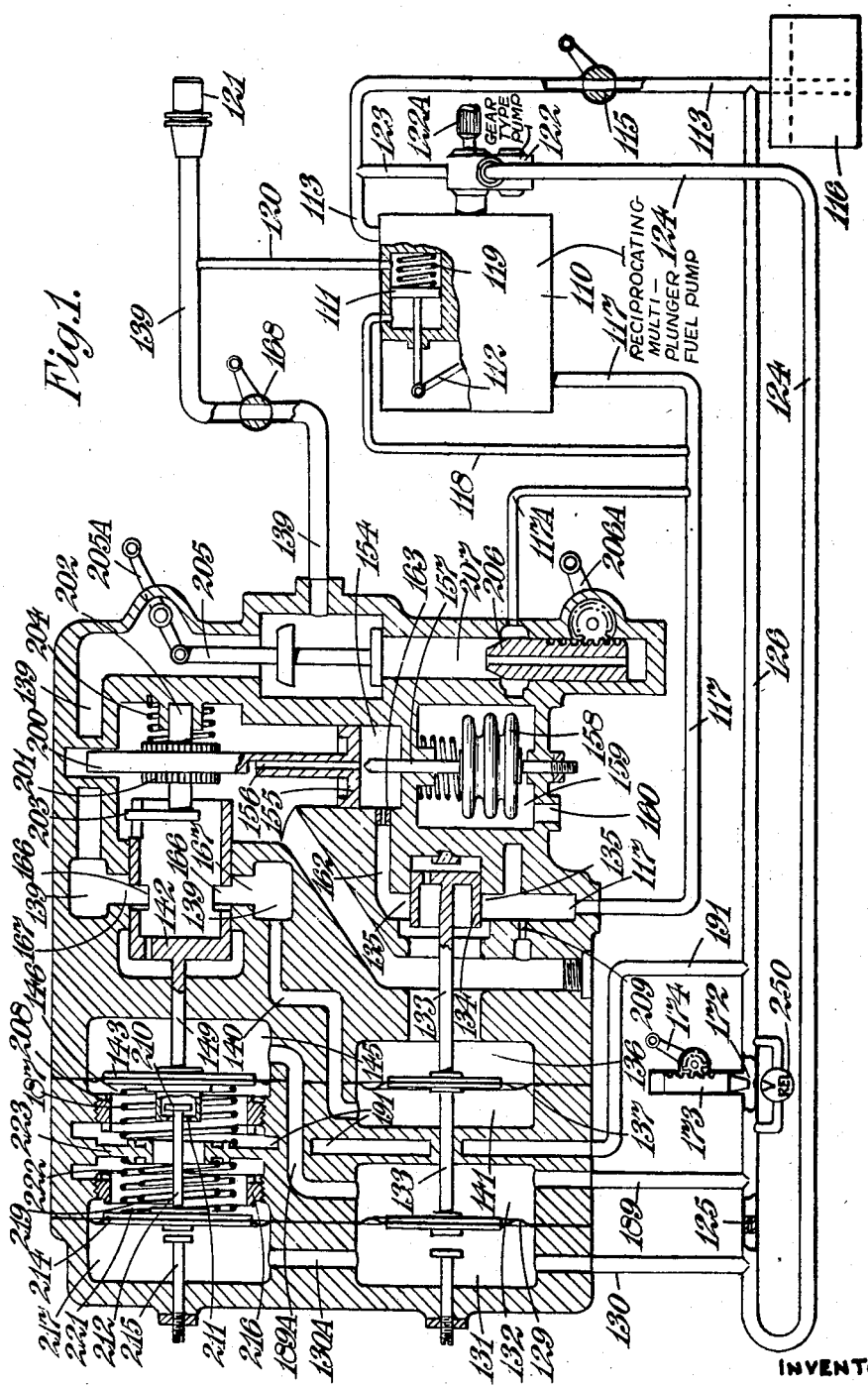
INVENTORS
K. R. DAVIES &
K. HERBSTRITT
by Wilkinson Mawhinney
ATTYS.

March 2, 1954  K. R. DAVIES ET AL  2,670,599
FUEL SYSTEM FOR GAS-TURBINE ENGINES
Filed Oct. 20, 1949  7 Sheets-Sheet 2

INVENTORS
K. R. DAVIES &
K. HERBSTRITT
by Wilkinson Mawhinney
Attys.

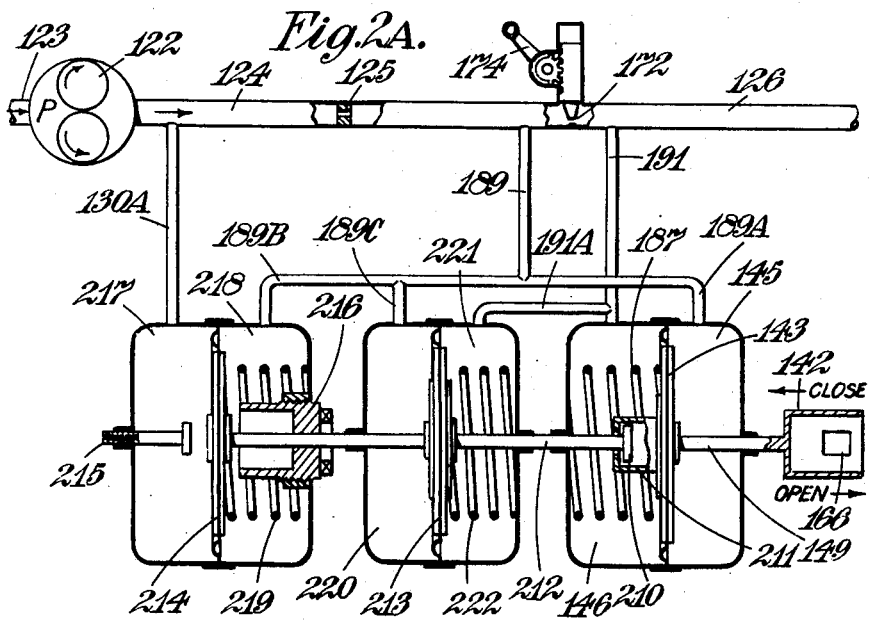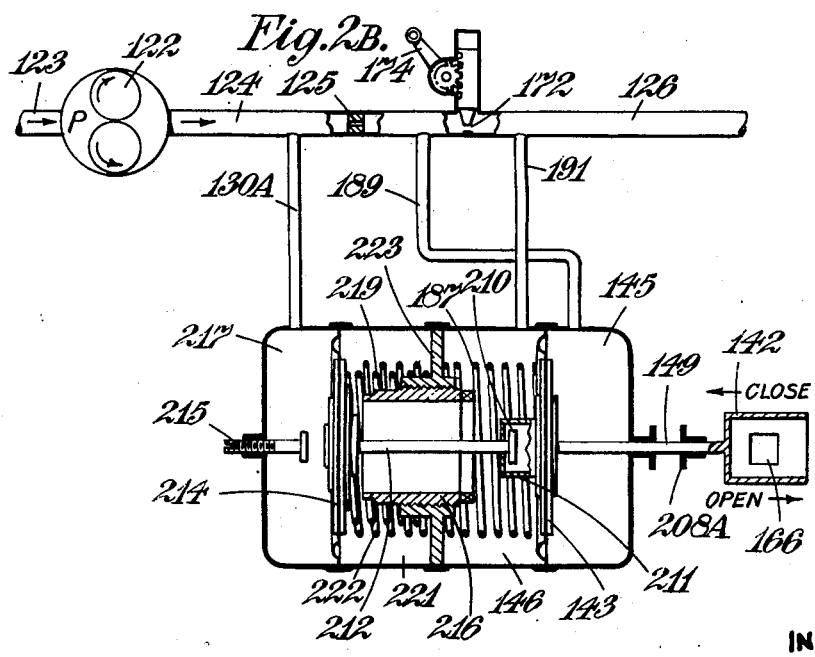

March 2, 1954   K. R. DAVIES ET AL   2,670,599
FUEL SYSTEM FOR GAS-TURBINE ENGINES
Filed Oct. 20, 1949   7 Sheets-Sheet 4

INVENTORS
K. R. DAVIES &
K. HERBSTRITT
by Wilkinson Mawhinney
Attys.

March 2, 1954  K. R. DAVIES ET AL  2,670,599
FUEL SYSTEM FOR GAS-TURBINE ENGINES
Filed Oct. 20, 1949  7 Sheets-Sheet 5

INVENTORS
K. R. DAVIES &
K. HERBSTRITT
by Wilkinson Mawhinney
Attys.

March 2, 1954  K. R. DAVIES ET AL  2,670,599
FUEL SYSTEM FOR GAS-TURBINE ENGINES
Filed Oct. 20, 1949  7 Sheets-Sheet 6
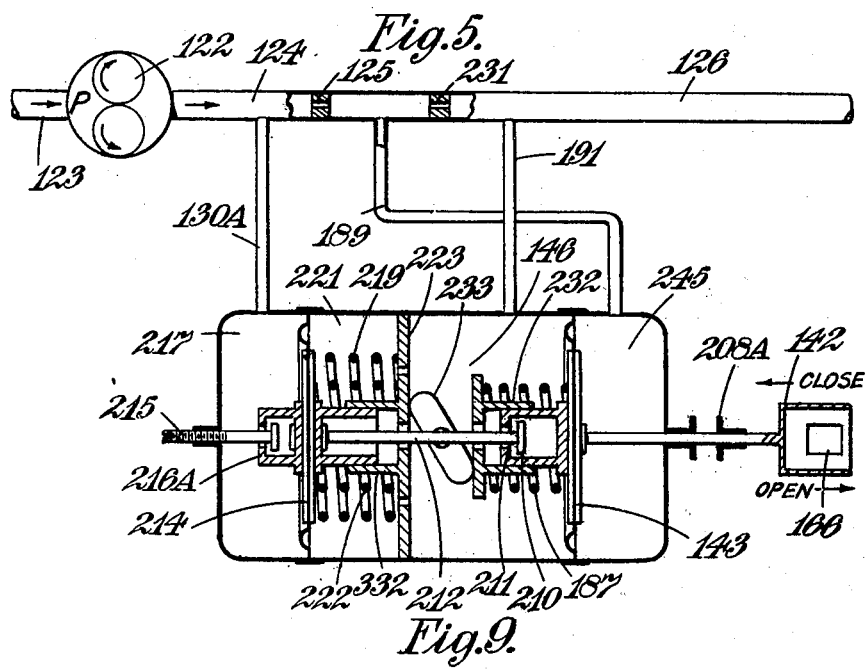
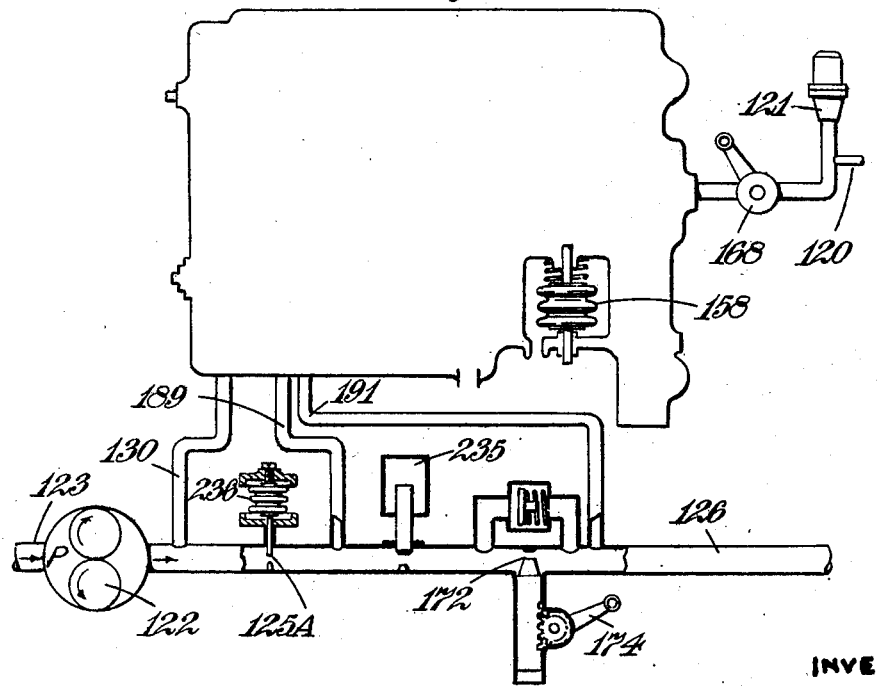
INVENTORS
K. R. DAVIES &
K. HERBSTRITT
by Wilkinson Mawhinney
Attys.

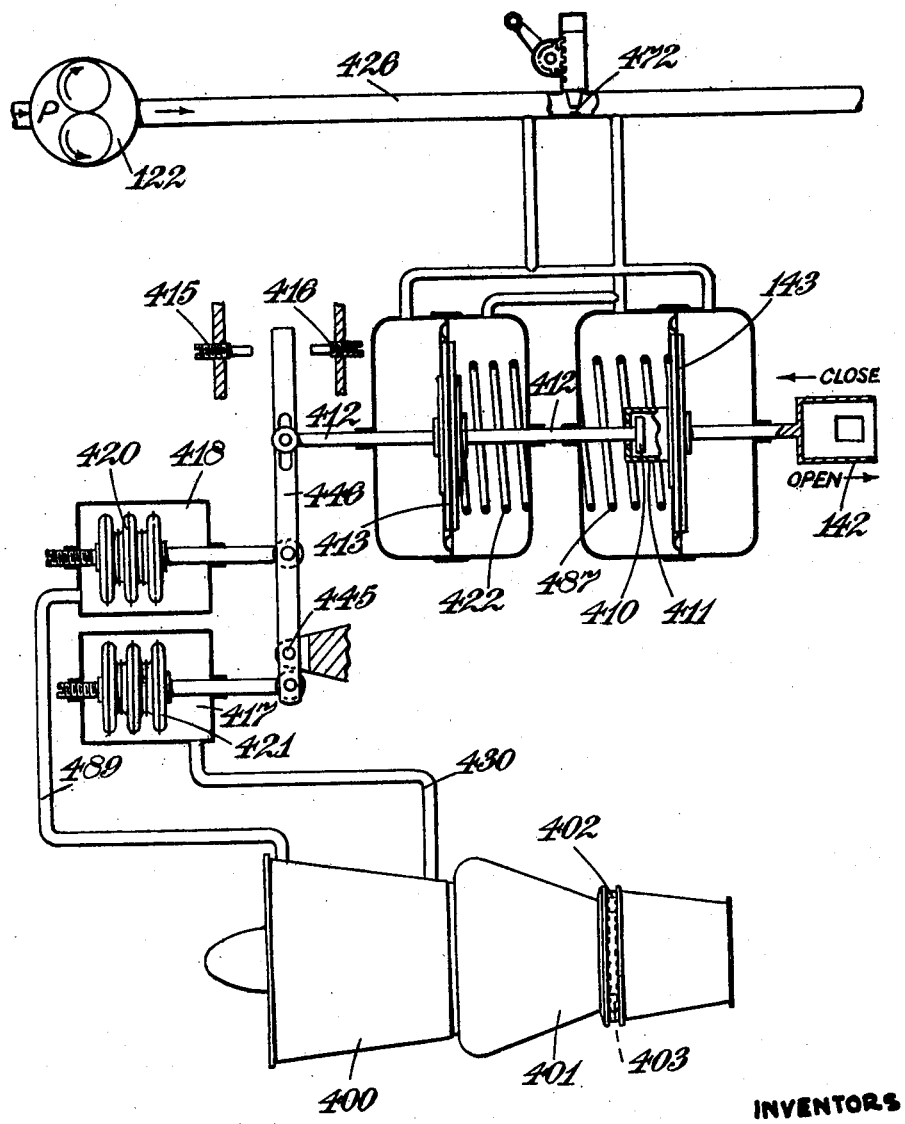

Patented Mar. 2, 1954

2,670,599

UNITED STATES PATENT OFFICE 2,670,599

FUEL SYSTEM FOR GAS-TURBINE ENGINES

Kenneth Roy Davies, Ockbrook, and Karl Herbstritt, Chellaston, England, assignors to Rolls-Royce Limited, Derby, England, a British company Application October 20, 1949, Serial No. 122,498

Claims priority, application Great Britain October 29, 1948

24 Claims. (Cl. 60—39.28)

1

This invention relates to fuel systems for gas turbine engines of the kind comprising governor means sensitive to the rotational speed of the engine and having a selectively variable speed datum, said governor means being operative to control the fuel supply to the engine to maintain a speed selected in accordance with the setting of the variable datum.

It is desirable in systems of this kind to provide means for limiting the maximum fuel flow obtainable during transient acceleration conditions, and hitherto the maximum obtainable fuel flow during these conditions has been determined in a manner such that the maximum fuel flow is substantially proportional to engine rotational speed. Due to the fuel consumption characteristics of a gas turbine engine correlated with speed it has been found that a maximum obtainable fuel flow so determined may give rise to excessive fuel deliveries during transient acceleration conditions.

Such overfuelling may give rise to high temperatures in the combustion equipment and turbine, and may possibly cause the flame to be extinguished. Overfuelling may also cause undesirable characteristics in the running of the engine, such as surge conditions in the compressor.

Accordingly, one object of the present invention seeks to provide means whereby the maximum fuel flow to the engine during transient acceleration conditions can be controlled in a desired manner.

The invention can be applied to fuel systems for gas turbine engines, of the type which include a mechanism hereinafter referred to as "hydraulic governor means" comprising a hydraulic pump of substantially fixed volumetric capacity driven at a speed proportional to engine speed and passing liquid through restricting orifice means, the pressure drop across said restricting orifice means being applied to a pressure responsive device. The pressure responsive means may be connected to effect variation of fuel delivered to the engine, thus to maintain an engine rotational speed selected by adjustment of the area of the restricting orifice means or by adjustment of a resilient load operating on the pressure responsive device, or by adjustment of both.

Another object of the invention is to provide such a system with means which is effective to permit an increase of the ratio of maximum permissible flow to engine speed during a transient acceleration when a preselected value of an engine operating variable is reached.

2

One important application of our present invention is to a fuel system for a gas turbine engine, such as we have described in our co-pending U. S. application No. 87,696, filed April 15, 1949, which comprises a first hydraulic governor means which is arranged to define for each rotational speed of the engine, a preselected maximum permissible fuel flow to the engine in excess of engine requirements for steady running at each such speed, and a second hydraulic governor means having a variable datum, which second governor means is arranged to reduce the fuel supply from such maximum available fuel supply according to a selected datum setting of the variable datum of the second hydraulic governor means.

Embodiments of the invention are diagrammatically illustrated in the accompanying drawings in which:

Figure 1 illustrates a fuel system suitable for a gas-turbine aircraft engine, which is functionally similar to those described in our copending United States application Serial No. 87,696;

Figures 2A and 2B illustrate stop mechanism for adjusting maximum obtainable fuel flow, the arrangement of Figurue 2B showing a simplification which is incorporated in Figure 1;

Figure 5 shows a modification of the arrangement shown in Figure 2B for use with an alternative form of engine control.

Figure 8 illustrates a stop mechanism which functions in yet another manner.

Figure 9 illustrates modifications in the hydraulic governor flow system shown in Figure 1.

Figure 1A:
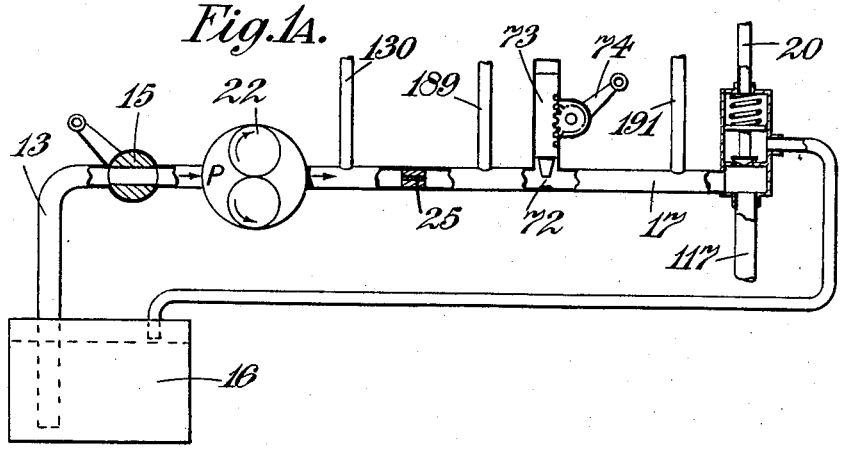
Figure 1A illustrates a modification of the fuel system illustrated in Figure 1.

Referring to Figure 1, the fuel system comprises a main fuel pump 110 e. g. of the reciprocating multi-plunger kind, the volumetric capacity of which can be varied by means of a piston 111 operating through lever 112. Fuel enters the pump 110 through suction pipe 113, which includes a manually operated low pressure shut-off cock 115. A fuel supply tank is diagrammatically illustrated at 116. The fuel pump pressure delivery pipe is shown at 117, from which pipe a pipeline 118 communicates with the cylinder in which the piston 111 operates to load the latter in the sense of reduction of the stroke of the pump. The piston is loaded in the opposite sense by means of a spring 119 and also by hydraulic pressure supplied through ducting 120 from the pipeline 139 delivering to the engine fuel injectors, one of the latter being shown at 121. This arrangement provides for a predetermined pressure difference between the pressure of the pump discharge and that at the fuel injectors.

In addition to the variable delivery fuel pump 110 there is a further pump 122 of the gear type which is driven by the engine at a speed proportional to that of the engine. As shown this latter pump is conveniently driven by the engine drive shaft 122A, which also drives the fuel pump 110. The pump 122 which is of substantially constant volumetric capacity, draws fuel from the supply pipe 113 through the pipeline 123, and delivers through discharge conduit 124. The flow through the pump is substantially directly proportional to the engine rotational speed. This flow is used in the hydraulic governing systems, passing through a fixed restriction 125 to a variable restriction 172. The flow is returned by pipeline 126 to the fuel suction pipe 113. The variable restriction 172 includes a valve element 173 adjusted by means of a control lever 174 which control lever constitutes the speed-selecting means for the engine. A relief valve 250 may be associated with the variable restriction 172 to by-pass flow past it when a predetermined maximum pressure drop is reached. Such a relief valve will avoid an excessive pressure drop arising for example when the lever 174 is operated rapidly to close the restriction 172 to reduce engine speed.

It will be appreciated that since the hydraulic delivery flow of the pump 122 is substantially proportional to the engine rotational speed, and the restriction 125 is fixed in size, a pressure drop arises across this orifice, which is proportional approximately to the square of the engine rotational speed. This pressure drop is applied to the flexible diaphragm 129, the pressure upstream of the orifice 125 being introduced by pressure tapping 130 (branching from the discharge conduit 124) into chamber 131 and the pressure downstream of the restriction being introduced by pressure tapping 189 into chamber 132. The diaphragm 129 is connected to a rod 133 which operates a slide valve 134, arranged to co-operate with a valve port 135 at the delivery end of the fuel supply pipe 117. The slide valve 134 thus controls the flow from the supply pipe 117 into an intermediate pressure chamber 136. The pressure in this chamber operates on a further diaphragm 137 which is connected to the rod 133, the rod being continuous through the diaphragm 137. The latter is additionally loaded by the pressure existing in the pipeline 139 through passageway 140 to chamber 141.

It will be appreciated that the slide valve 134 is controlled as to position by the balance of the loads on the diaphragms 129 and 137. The load on the diaphragm 129 is approximately proportional to the square of the engine rotational speed and the load on the diaphragm 137 is proportional to the pressure drop existing between the intermediate chamber 136 and the fuel supply pipe line 139 to injectors such as 121.

A second hydraulic governing means is provided for controlling a further slide valve, indicated at 142, throttling the conduit between the intermediate chamber 136 and pipeline 139. This valve can be moved in two senses, namely in rotational movement and in axial movement, respectively by an altitude sensitive device and by the pressure sensitive device of the second hydraulic governing means. The pressure sensitive device of the second hydraulic governing means comprises a diaphragm 143 which is subjected to the pressure drop across the variable restriction 172, the pressure on the upstream side of this restriction being communicated through pressure tapping 189A from chamber 132, to the chamber 145, whilst pressure downstream of the orifice is communicated by passageway 191 to chamber 146. The diaphragm 143 is additionally loaded by means of a spring 187. Movement of the diaphragm 143 is transmitted to the slide valve 142 through a push-pull rod 149.

In the rotational sense of movement the valve 142 is controlled by means of an altitude sensitive capsule 158 accommodated within chamber 159 which chamber is subjected to atmospheric pressure through connection 160. The capsule is of the kind which expands axially as the result of reduction of atmospheric pressure to which it is subjected. Axial expansion thereof is transmitted by a servo device to a sliding rack member 200 which carries a servo piston 155. The rack member 200 engages a pinion 201 carried on shaft 202, and having crosshead 203 engaging the valve 142 in an axially directed slot. The arrangement is such that upward movement of the piston 155 results in rotation of the valve 142 in the sense of closure, whilst downward movement of the piston 155 results in movement in the sense of opening. A torsion spring 204 biasses the piston 155 in the downward sense, i. e. in the sense of opening the valve 142. The piston 155 is moved in the sense of closing the valve, i. e. upwards, by servo pressure liquid which is derived through passageway 162 from the fuel pressure supply pipe 117. The pressure liquid enters the cylinder space 154 through restricted orifice 163 and a plunger rod 157 connected to the evacuated capsule 158 operates as a valve controlling the flow of pressure liquid through passage 156 extending through the piston 155. The pressure on the upper side of the piston 155 is that existing in the intermediate chamber 136, and is thus of a lower value than that existing in the fuel supply pipe 117 so that, in operation, the area of the restricted orifice 163 is correlated with the area of the passageway 156, valved by the rod 157, to maintain balance of hydraulic and other loads of the piston. Thus if the capsule expands, the rod 157 closes the passageway 156 resulting in a build up of servo pressure causing the piston to move upwards and adjust the setting of the slide valve 142 in the sense of closure. Contraction of the capsule 158 opens the passageway 156 tending to equalize pressure on both sides of the piston 155 when the slide valve 142 moves in the sense of opening under the influence of the spring 204 to follow up the movement to the rod 157.

The fuel system also includes a high pressure shut-off-cock 168 incorporated in the fuel supply pipeline 139, used in shutting down of the engine. In addition, as illustrated, an emergency changeover valve 205 is provided which can be operated by control lever 205A to isolate the hydraulic governor control system described.

An emergency manual fuel throttle 206, operated by lever 206A, can then be used to control the fuel delivery from the fuel pressure supply pipe 117 through branch 117A to chamber 207. The latter communicates with the fuel delivery pipeline 139 to fuel nozzles 121. This part of the system is solely for emergency operation in the event of failure of the hydraulic governor control.

The fuel system so far described is in accordance with the invention of our prior U. S. application Serial No. 87,696 and its functioning is similar to the principles outlined in the specification of that application. Thus the valve 142 is incorporated to modify the flow from the intermediate chamber 136 appropriate for the running condition of the engine as selected by the positioning of the lever 174 to define the area of the restricting orifice 172. The slide valve 142 is formed with ports 166 of rectangular form co-operating with the ports 167 at the inlet to the passageway 139 delivering fuel to the fuel injectors 121. The arrangement is such that axial movement of the valve to the left results in reduction of the port areas at 166, whilst rotational movement of the valve arising from expansion of the capsule 158 also causes reduction of the port areas.

The restriction afforded by the ports 166 is increased when the second hydraulic governor, operating through diaphragm 143, senses an engine speed in excess of that selected by a setting of the lever 174, i. e. when the pressure drop between chambers 145 and 146 exerts a load overcoming the spring loading 187. Alternatively, if the hydraulic governor senses a speed which is less than that selected by the setting of the lever 174, i. e. when the load exerted by the pressure drop between chambers 145 and 146 is overcome by the spring 187, the valve 142 will move to the right so as to increase the port areas 166 and thus reduce the restriction to fuel flow between chamber 136 and delivery pipeline 139.

The pressure difference between the delivery pipeline 139 and chamber 136 is however maintained to be substantially proportional to the square of the engine rotational speed, this pressure difference being determined by balance of the hydraulic loadings on the diaphragms 129 and 137.

Neglecting variations in altitude, when the lever 174 is rapidly moved to reduce the restriction afforded by a restricting orifice 172, the valve 142 moves to a maximum open position, and the maximum flow of fuel to the engine is then dependent upon the areas of ports 166, and on the pressure difference across them. This pressure difference is maintained substantially proportional to the square of the engine rotational speed, therefore during transient acceleration conditions the maximum amount of fuel which can pass to the injectors is proportional to the engine speed, being defined by the maximum port areas 166.

Again neglecting variations in altitude, when the control lever 174 is moved to increase the restriction afforded by the restricting orifice 172 the diaphragm 143 will be moved to the left against stop 208 to move the valve 142 and reduce the port areas 166 to a minimum value. Thus during transient deceleration conditions the minimum flow of fuel which can pass to the engine is defined by the minimum areas of the ports 166 and is substantially proportional to engine speed.

These maximum and minimum fuel flows are, however, in fact also modified by the functioning of the capsule 158 which further reduces the area of the ports 166 with increase of altitude.

It will be appreciated that the main fuel pump need not be of the variable volumetric kind but could be a constant volumetric capacity pump with a leak-off back to the fuel reservoir from the discharge pipe of the pump. Figure 1A illustrates such a system where it differs from the one described above. In Figure 1A, the reference numeral 16 indicates a fuel-supply tank, from which fuel is supplied through suction-pipe 13 and a manually-operated low-pressure shut-off-cock 15 to the constant-volume pump 22, which is the main fuel pump of the engine. From the pump 22, the fuel passes through a discharge conduit 17 which contains a variable restriction 72, which includes a valve element 73 adjustable by means of the control lever 74. The discharge conduit also contains a fixed restriction 25 between the pump 22 and the variable restriction 72. Excess fuel, delivered by the pump 22, over that required by the engine, is returned to the tank 16, through the relief valve 20.

The system described is connected to supply fuel to the fuel injectors of the engine through a pair of hydraulic governors arranged as above described. The pressure tapping 130 is taken from the discharge conduit 17 upstream of the fixed restriction 25, the pressure tapping 189 is taken from between the fixed restriction 25 and variable restriction 72, and the pressure tapping 191 is taken from downstream of the variable restriction 72. Downstream of the relief valve 20 the discharge conduit 17 is connected to the fuel delivery pipe 117.

The present invention provides automatically adjusted stop mechanism for modifying the maximum obtainable fuel flow to the engine during transient acceleration conditions. The functioning of one embodiment of the present invention may be more readily appreciated by reference to the diagrammatic sketches Figures 2A and 2B, and by reference to further description which follows of its application to the fuel system shown in Figure 1.

Referring to Figure 2A the constant volume gear pump of the hydraulic governing systems is indicated at 122 receiving fuel from pipeline 123 and delivering it to discharge conduit 124, in which there is located a fixed restriction 125 and variable restriction 172. The slide valve 142 is operated through rod 149 connected to diaphragm 143. The directions of movement in sense of opening and closing of the valve 142 are indicated by arrows on the sketch, and the items above referenced and others as appropriate correspond to those similarly referenced in Figure 1. The pressure chamber 145 on one side of the diaphragm 143 is loaded through pressure tappings 189 and 189A by the pressure on the upstream side of the variable restriction 172. The diaphragm 143 is additionally loaded on its other side by pressure in chamber 146 from the downstream side of the variable restriction orifice 172 through pressure tapping 191, and further by the spring 187. The axial movement of the valve 142 in the sense of opening is limited by means of a stop 210 co-operating with abutment 211 carried by the diaphragm 143. It will be appreciated that the axial position of stop 210 defines the extent of maximum opening of the valve 142 due to axial movement, this stop being supported on a rod 212 which is continuous through and connected to diaphragm 213 and further connected to diaphragm 214. The movement of diaphragm 214 is limited by stops 215 and 216 respectively in chamber 217 and chamber 218, these stops preferably being manually adjustable. The diaphragm 214 is loaded hydraulically in chamber 217 through pressure tapping 130A by the pressure existing on the upstream side of the fixed restriction 125; the diaphragm 214 is also loaded on its other side in chamber 218 by the pressure existing on the downstream side of the fixed restriction 125 through pressure tappings 139 and 139B, and further by a spring 219.

Neglecting for the purpose of immediate explanation the interaction of hydraulic loadings on diaphragm 143 and 214 it will be appreciated the loading on thre spring 219 can be chosen so that at low engine speed, when the pressure drop across the restriction 125 is small, the diaphragm 214 is urged against the left hand stop 215 so that the stop 210 will be in its extreme left hand position, thus restricting the maximum area of the port 166 in the slide valve 142. At a preselected engine rotational speed the pressure drop across the fixed restriction 125 loads the diaphragm 214 to overcome the loading of the spring 219 moving the diaphragm 214 against the right hand stop 216, thus moving the stop 210 so as to permit greater maximum area of the port 166. Thus it can be arranged that at a speed above a preselected value the maximum obtainable area of port 166 is increased as compared with the maximum obtainable area below the preselected speed.

It will be appreciated however that when the stop 210 is operative against abutment 211, the loading on diaphragm 143 must be balanced since it would affect the setting of the stop 210. To this end a third diaphragm 213 is provided. Chamber 220 on one side of this diaphragm is loaded by hydraulic pressure derived from the upstream side of the variable restriction 172 through pressure tappings 189 and 189C. On the other side diaphragm 213 is loaded by hydraulic pressure in chamber 221 derived from the downstream side of the variable restriction 172 through pressure tapping 191A. Further a spring 222 additionally loads the diaphragm 213. The areas of the diaphragms 213 and 143 are the same; the loading of the springs 187 and 222 are equal in a mean position; and the pressure loadings on opposite sides, through pressure tappings 189A, 189C, 191, 191A, are identical. Thus when the stop 210 cooperates with the abutment 211 the loads on these two diaphragm assemblies 143 and 213 are balanced. This condition will arise during transient acceleration conditions when the stop 210 is operative to limit the opening movement of the valve 142, and during these conditions up to a preselected engine rotational speed defined by the loading on the spring 219, the loading on the diaphragm 214 operates to define the position of the stop 210, the loadings on the diaphragms 143 and 213 being balanced against each other.

A simplification of the system above described is shown in Figure 2B. Considering diaphragms 213 and 214 of Figure 2A, it will be seen that chambers 218 and 220 are loaded by the same pressure, through pressure tappings 189B and 189C. This arises since, in the particular arrangement, the pressure on the downstream side of the fixed restricting orifice 125 is identical with that existing on the upstream side of the variable restricting orifice 172. If the diaphragm 213 has the same area as that of diaphragm 214 then these pressure loadings will cancel out, thus in effect these two loadings can conveniently be omitted. This gives rise to the simplification shown in Figure 2B in which the constant volume governor pump 122 delivers to fixed restriction 125 and thence through the variable restriction 172. The slide valve 142 is again illustrated with port area 166, and is connected by rod 149 with diaphragm 143 loaded in chamber 145 by pressure existing on the upstream side of the variable restriction 172 through pressure tapping 189. The diaphragm 143 supports abutment 211 cooperating with stop 210 carried on rod 212 connected to diaphragm 214. Diaphragm 214 is loaded in chamber 217 by hydraulic pressure derived from the upstream side of the fixed restriction 125 through pressure tapping 130A and its movement to the left is limited by stop 215. Intermediate the two diaphragms 143 and 214 is a common pressure chamber with an internally directed wall formation 223 providing fixed abutments for diaphragm loading springs equivalent to those shown in Figure 2A; thus diaphragm 143 is loaded by spring 187 in chamber 146 and diaphragm 214 is loaded by springs 219 and 222 in chamber 221 (common with chamber 146).

The wall formation 223 also supports an adjustable stop 216 limiting the right hand movement of diaphragm 214. A stop 208A on the rod 149 (equivalent to stop 208 in chamber 146 in Figure 1) limits the movement of the valve 142 in the sense of reducing port area 166.

Functionally the arrangement of Figure 2B is similar to that of Figure 2A, movement of diaphragm 214 adjusting the stop 210 in axial location and the hydraulic and spring loadings on diaphragm 143 being balanced against equal loads when the stop 210 is operative against abutment 211.

Referring again to Figure 1, the adjustable stop mechanism diagrammatically illustrated in Figure 2B is associated with the diaphragm 143. Thus the spring 187 loads the diaphragm 143 in the sense of opening of the port areas 166 and the extent of opening is limited by the stop 210 co-operating with abutment 211 carried by diaphragm 143. There is further illustrated diaphragm 214 loaded by hydraulic pressure in chamber 221 (common with chamber 146), the pressure being derived through pressure tapping 191 from the downstream side of the variable restriction 172. This side of the diaphragm 214 is additionally loaded by springs 219 and 222. The inwardly extending wall 223 constitutes abutments for springs 187, 219 and 222. On its other side the diaphragm 214 is loaded by the hydraulic pressure existing in chamber 217 which pressure is derived through pressure tapping 130A, chamber 131 and pressure tapping 130 from the upstream side of the fixed restriction 125. A selectively adjustable stop 215 limits the movement of the diaphragm 214 in the left hand sense, thus to define the amount by which the maximum openings by axial movement of port areas 166 is reduced at rotational speeds of the engine below that at which the pressure drop across the diaphragm 214 exceeds the loading of the spring 219. Additionally adjustable stop 216 defines the limit of the movement of the diaphragm 214 to the right, thus to define the maximum area of opening of the ports 166 which can be obtained.

During steady running conditions it will be appreciated that the stop 210 will be inoperative, i. e. out of contact with the abutment 211 and thus the second governor will perform its normal cut-off function.

Although not forming a feature of the present invention, it should be mentioned that the bleed orifice 209 between the fuel supply line 117 and intermediate chamber 136 by-passing the valve 134, is incorporated to provide a predetermined minimum fuel flow for idling purposes.

Figure 3A:
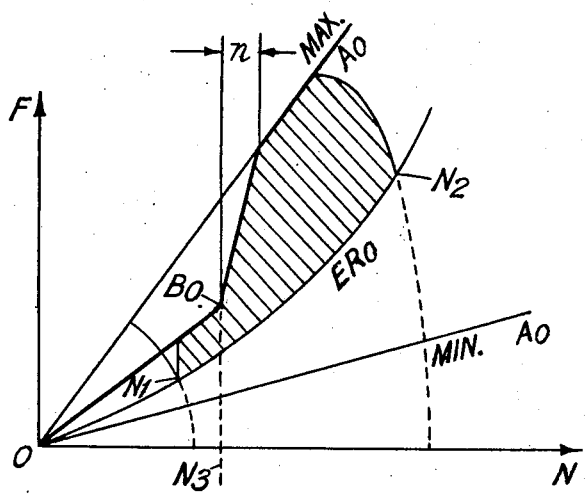
Figures 3A and 3B are diagrams plotting fuel flow (F) against rotational speed (N) illustrating the functioning of the invention.
Figure 3B:
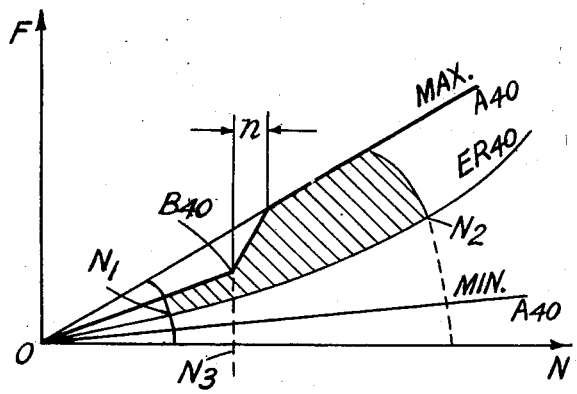

The functioning of the system described may be more readily appreciated by reference to Figures 3A and 3B. These figures illustrate diagrammatically curves plotting fuel flow (F) against engine rotational speed (N). Figure 3A indicates the curves for low altitude conditions, utilising the suffix 0, and Figure 3B illustrates curves for high altitude conditions, utilising the suffix 40, equivalent, for example, to the conditions at 40,000 ft. altitude.

Assuming for the purpose of explanation that in Figure 1 the capsule 158 does not operate to move the valve by rotation from its low altitude position and the diaphragm 214 is hard up against the adjustable stop 216, i. e. so that the stop 210 permits a maximum opening of the port areas 166 by axial movement of the valve, then in Figure 3A straight lines O $A_0$ (Max) and O $A_0$ (Min) show respectively the maximum and minimum flow lines as defined by the first hydraulic governor operated valve 134 and the maximum and minimum areas of the valve port 166 obtained by axial movement of the valve between the stop 210 and the stop 208. The line O $A_0$ (Max) indicates the maximum obtainable fuel flow for the low altitude position of the valve 142, i. e. the fuel flow obtained when the valve 142 is fully open by axial movement, and the slope of this line at any point indicates the ratio of maximum obtainable fuel flow to engine rotational speed at that point. The line O $A_0$ (Min) indicates the fuel flow when the valve 142 is fully closed by axial movement. The engine requirement fuel line e. g. for a gas-turbine jet-propulsion engine is indicated by the curve $ER_0$ and lies between O $A_0$ (Max) and O $A_0$ (Min).

In Figure 3B similar flow lines O $A_{40}$ (Max) O $A_{40}$ (Min) are shown, defined by the setting of the valve 142 after rotation by the pressure capsule 158 when subjected to pressure at high altitude, e. g. 40,000 ft. The engine requirement line is indicated at $ER_{40}$.

As described in our co-pending U. S. application Serial No. 87,696, the engine speed is selected by manual adjustment of the variable restriction 172, the operation of the second hydraulic governor being such that when the pressure drop across this restriction reaches the value at which the hydraulic loading on the diaphragm 143 overcomes the spring loading 187, the valve 142 is moved to reduce the port areas 166 and thus reduce the fuel supply to the engine along governor cut-off lines. The intersection of two governor cut-off lines for two selected speeds is shown at $N_1$ and $N_2$, cutting the engine requirement lines $ER_0$ and $ER_{40}$ as illustrated in Figures 3A and 3B.

Assume that the engine speed is stabilised at $N_1$ and the control lever 174 is then rapidly moved to open the area of the restriction 172 in order to select the speed giving the intersection at $N_2$. The immediate result of opening of the restriction 172 is to reduce the pressure drop across this restriction, so that the valve 142 is opened by the spring 187 to give the maximum port areas at 166, as defined by the stop 210 and abutment 211. Still assuming for the purpose of explanation, that the stop 210 is located to give the maximum obtainable port areas 166, fuel will be supplied to the engine during the transient acceleration condition in accordance with the maximum obtainable fuel flow lines O $A_0$ (Max) and O $A_{40}$ (Max) (Figures 3A and 3B). The fuel ordinates lying between the O $A_0$ (Max) and $ER_0$ (Figure 3A), and O $A_{40}$ (Max) and $ER_{40}$ (Figure 3B) indicates the excess fuel passing to the engine during the transient acceleration condition.

In the case of certain engines this amount of excess fuel results in engine running characteristics of an undesirable nature, which can be attributed to overfueling. Such overfueling may result in extinction of combustion and/or surging of the compressor of the engine.

The present invention provides, by the adjustable stop mechanism associated with the diaphragm 143 previously described, for the reduction of the ratio of maximum obtainable fuel flow to engine rotational speed at speeds below a preselected value. Thus the spring 219 urges the diaphragm 214 to the left to adjust the stop 210 providing maximum port areas 166, obtainable by axial movement of the valve, which are less than those giving the maximum flow lines O $A_0$ (Max) and O $A_{40}$ (Max).

The maximum flow lines for the location of the stop 210 arising when the diaphragm 214 abuts stop 215 under the influence of the spring 219 are indicated at O $B_0$ (Figure 3A) and O $B_{40}$ (Figure 3B), which have a smaller slope than lines O $A_0$ (Max) and O $A_{40}$ (Max) respectively and so indicate a smaller ratio of maximum fuel flow to engine rotational speed.

When the engine rotational speed reaches a preselected value $N_3$ during the transient acceleration condition the pressure drop across the fixed restricting orifice 125 reaches a value such that the spring loading 219 is overcome and the diaphragm 214 starts to move to the right to adjust the stop 210. The greater opening of the port areas 166, corresponding to the maximum obtainable flow lines O $A_0$ (Max) (Figure 3A) and O $A_{40}$ (Max) (Figure 3B) is thus permitted. Due to the rating of spring 219 the changeover from maximum flow lines O $B_0$, O $B_{40}$ to O $A_0$ and O $A_{40}$ takes place over a speed range shown by $n$. At instantaneous speeds lying in the range of $n$ the maximum fuel flow will follow the lines shown joining O $B_0$, O $B_{40}$ and O $A_0$ (Max), O $A_{40}$ (Max) respectively, as indicated. As will be seen a reduced value of the ratio of maximum obtainable fuel flow to engine rotational speed during the transient acceleration condition is maintained until the rotational speed reaches $N_3$ after which it increases to attain the value defined by the maximum flow lines O $A_0$ (Max) and O $A_{40}$ (Max). For a change of speed selected as between $N_1$ and $N_2$, the excess fuel supplied during acceleration is shown by the cross-hatched area.

It will be appreciated that, in the system described with reference to Figure 1, the value of $N_3$ can be preselected by a suitable loading of spring 219 in relation to the area of the restriction 125 and the flow therethrough. Further the slope of the maximum flow line joining O $B_0$ and O $A_0$ (Max) and similarly that joining O $B_{40}$ with O $A_{40}$ can be chosen by the appropriate selection of the rating of the spring 219.

Figure 4A:
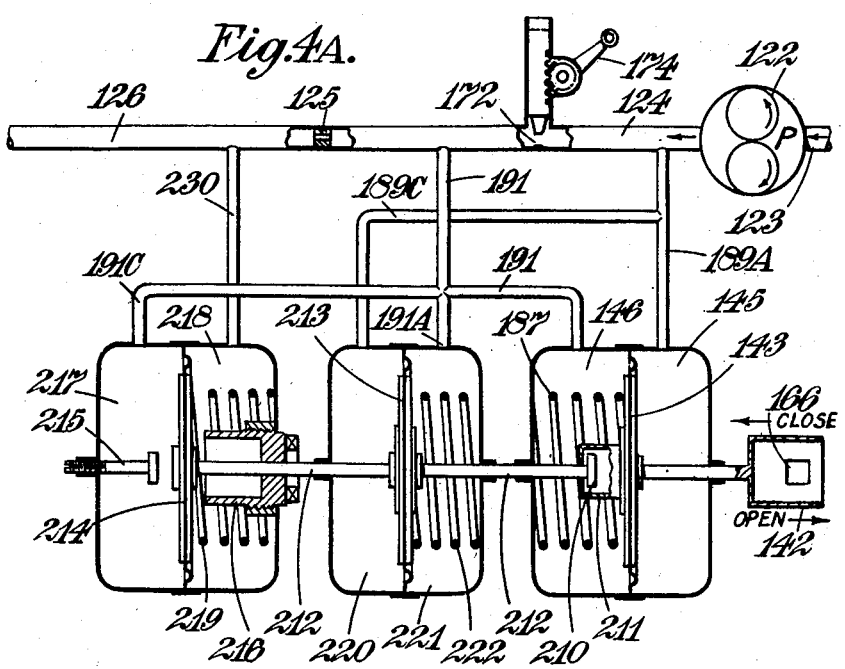
Figures 4A and 4B illustrate a modification of the arrangements shown in Figures 2A, 2B.
Figure 4B:
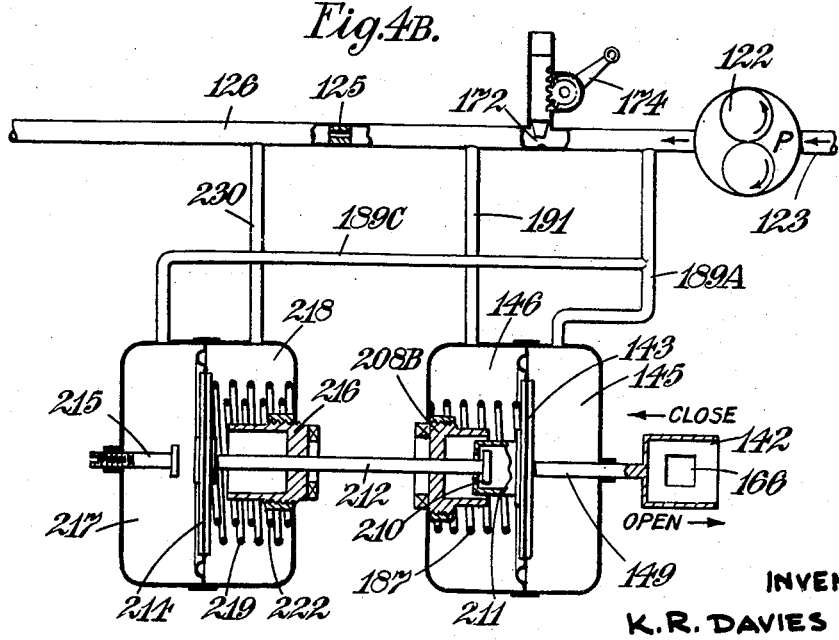

A further variant of the arrangement shown in Figures 2A and 2B is illustrated in Figures 4A and 4B. In this case the location of the fixed restriction 125 and the variable restriction 172 in the discharge duct from the pump are reversed as compared with the arrangement of Figures 2A and 2B. The pressure drop across the variable restriction 172 is applied as previously to diaphragm 143 by pressure tapping 189A communicating with chamber 145 from the upstream side of the restriction 172, and by pressure tapping 191 communicating with chamber 146 from the downstream side of the restriction 172. The diaphragm is additionally loaded by spring 187 in chamber 146 and carries abutment 211 co-operating with the stop 210. The latter is carried on the rod 212 continuous through and connected to the diaphragm 213 and also connected to the diaphragm 214. The diaphragm 213 constitutes, as in the case of the arrangement shown in Figure 2A, a device for balancing the hydraulic loading on the diaphragm 143 when the stop 210 and abutment 211 interengage. To this end the diaphragm 213 is loaded hydraulically through pressure tapping 191A in chamber 221 and additionally by spring 222 in this chamber. On its other side the diaphragm is loaded through pressure tapping 189C in chamber 220. The movement of the diaphragm 214 is limited by adjustable stops 215, 216, as in the case of the arrangement of Figure 2A, and this diaphragm is loaded in chamber 217 by the pressure on the upstream side of the fixed restriction 125 through pressure tapping 191C. On its other side in chamber 218 the diaphragm is loaded by spring 219 and by the pressure on the downstream side of the fixed restriction 125 through pressure tapping 230.

The functioning of the arrangement of Figure 4A is similar to that described in relation to Figure 2A, the stop 210 being adjusted by diaphragm 214 so as to reduce the maximum value of the port area 166 obtainable by axial movement of the valve 142 below a preselected rotational speed and to permit increased maximum area obtainable by axial movement of the valve 142 above the said preselected speed. Whilst the stop 210 is operative against abutment 211 the hydraulic and spring loads on diaphragms 213 and 143 balance out.

The arrangement of Figure 4A can be simplified in a manner similar to that of Figure 2B, as shown in Figure 4B. It will be noted that the hydraulic loadings on the diaphragms 214 and 213 respectively (Figure 4A) in chambers 217 and 221 are identical. Thus if the areas of the two diaphragms are the same these hydraulic loadings cancel out and can conveniently be omitted giving rise to simplification of Figure 4B.

The constant volume governor pump 122 delivers to the variable restriction 172 and thence to the fixed restriction 125 in the discharge conduit 126.

The slide valve 142 is again illustrated with port area 166, connected by rod 149 with diaphragm 143. The latter is loaded in chamber 145 by the pressure existing on the upstream side of the variable restriction 172 through pressure tapping 189A. The diaphragm 143 supports abutment 211 co-operating with stop 210 carried on rod 212 connected with diaphragm 214. Diaphragm 214 is loaded in chamber 217 by hydraulic pressure derived from the upstream side of the variable restriction 172 through pressure tapping 189C and its movement to the left is limited by stop 215.

The diaphragm 214 is loaded in chamber 218 by hydraulic pressure derived from the downstream side of the fixed restriction 125 through pressure tapping 230. Diaphragm 214 is also loaded in chamber 218 by springs 222 and 219, equivalent to those shown in Figure 4A. The movement of the diaphragm to the right is limited by preselectively adjustable stop 216. Further a stop 208B limits the right hand movement of the valve 142 in the sense of reducing the port area 166 to define the minimum port area during deceleration conditions. Functionally the arrangement of Figure 4B is similar to that of Figure 4A, the movement of the diaphragm 214 adjusting the stop 210 in axial location and the hydraulic and spring loads on diaphragm 143 being balanced against equal loads when the stop 210 is operative against abutment 211.

The arrangement of Figure 4B can conveniently be incorporated in the system of Figure 1 by locating the fixed restriction 125 on the downstream side of the connection of pipeline 191 with pipeline 126. Thus referring to Figure 1, the connections 130 and 189 will be made respectively to the upstream and downstream sides of the fixed restriction 125 thus located. The dividing wall 223 will extend into sealing engagement with the rod 212 supporting the stop 210 to constitute two distinct chambers 221 and 146. The interconnecting passage 130A will be deleted and separate hydraulic connections made to chambers 217 and 221 (equivalent to chamber 218 in Figure 4B), these connections being respectively made to the upstream side of the variable restriction 172 and to the downstream side of the fixed restriction 125. In addition, the interconnecting passage 189A will be deleted and a hydraulic connection made to the upstream side of the variable restriction.

As described in our co-pending U. S. application Serial No. 87,696, an alternative method of selecting the engine speed is possible which involves the selective adjustment of the load of the spring 187 on the diaphragm 143; the variable restriction 172 being replaced by an additional fixed area restriction. Such a form of control may be advantageous for certain engines and Figure 5 illustrates the application of maximum fuel flow stop adjusting mechanism to a system of this kind.

The arrangement of Figure 5 is immediately comparable with the arrangement of Figure 2B and may be arrived at through the process of simplification of the arrangement of Figure 2A. In Figure 5 the reference numerals and major parts of the construction correspond throughout to those of the arrangement of Figure 2B, there being additionally incorporated mechanism for selectively adjusting the loading on the spring 187 and simultaneously and comparably adjusting the load on spring 222. To this end the springs 187 and 222 bear against sleeves 232, 332 which are slidably adjustable towards and away from the diaphragm 214 and 143.

Sleeve 232 associated with the spring 187 slides on the abutment 211 carried by diaphragm 143 and the sleeve 332 associated with spring 222 slides on a collar supported by diaphragm 214. Interposed between the two sleeves 232 and 332 is a rotatable cam 233 having arms contacting exterior plane surfaces of the sleeve. Selective rotation of the cam by a suitable control lever adjusts the load on both springs 187 and 222 simultaneously. In this manner the balance of the spring loads when the stop 210 engages the abutment 211 is maintained.

It should be noted that the spring 219 is unaffected by the rotation of the cam 233, its abutment against radially inwardly extending wall 223 being fixed. Abutment 216A, carried by the diaphragm 214 limits the movement of the diaphragm 214 to the right and corresponds to the stop 216 shown in Figure 2B.

It will be appreciated that in the system described above, the adjustment of the maximum fuel flow stop takes place at a preselected engine rotational speed. In addition, it is convenient to use as described the pressure drop which arises over a fixed restriction 125 in the stop adjusting mechanism, this restriction being primarily incorporated for the purpose of loading the diaphragm 129. In certain cases a separate fixed restriction may be provided specifically to produce the pressure drop operating the stop adjusting mechanism.

Further, the stop adjusting mechanism can be controlled according to other conditions associated with the running of the engine. For example the changeover may be effected when a given predetermined actual fuel flow to the engine is reached.

Figure 6:
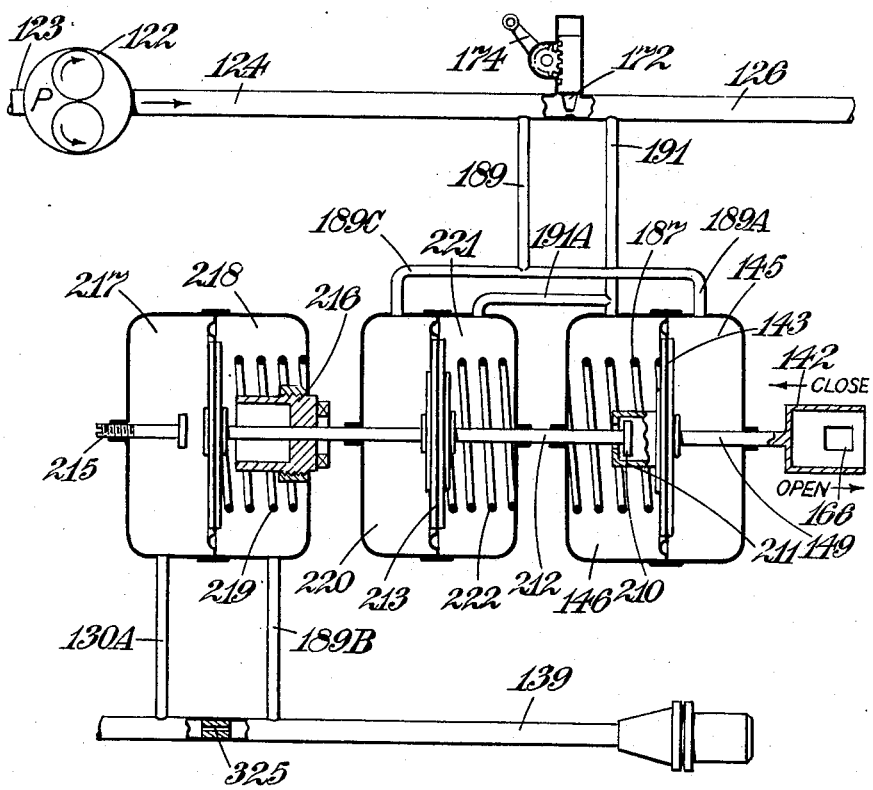
Figure 6 illustrates a stop mechanism which functions in a different manner.

A part of such a system is illustrated in Figure 6 and it will be seen that it comprises a diaphragm arrangement as shown in Figure 2A. However the discharge conduit 124 of the constant volume pump 122 does not contain a fixed restriction, but instead a fixed restriction 325 is contained in the fuel delivery pipe 139 and is located so that all the fuel flowing to the engine passes through it. The pressure drop across this fixed restriction 325 is applied to the diaphragm 214 by means of the pressure tappings 139A and 189B. Elsewhere the system is the same as that described with reference to Figure 2A, and the same reference numerals have been used to indicate the corresponding parts.

The system described with reference to Figure 6 will operate so that when a predetermined fuel flow is reached the spring 219 is compressed to increase the maximum permissible opening of the port area 166.

Figure 7:
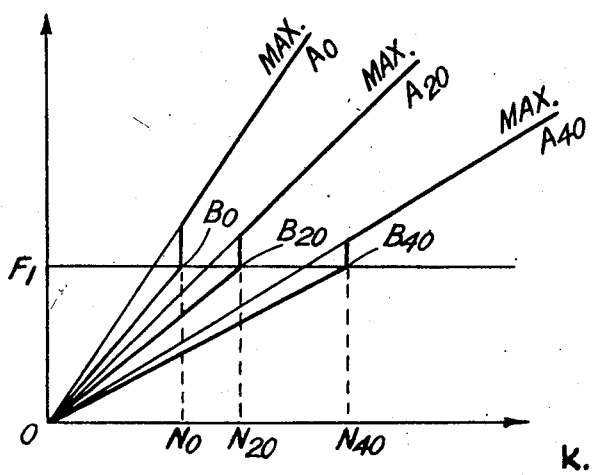
Figure 7 is a diagram plotting fuel flow (F) against rotational speed (N) illustrating the functioning of the mechanism shown in Figure 6.

Maximum obtainable fuel flow lines for such a system are illustrated in Figure 7 where lines O B₀, O B₂₀, O B₄₀ show the maximum obtainable fuel flows, i. e. the actual fuel deliveries during transient acceleration conditions, for low altitude and intermediate altitude and high altitude respectively. At actual fuel flow $F_1$ the diaphragm to which the pressure drop arising from the fuel flow through the restriction is applied will compress the loading spring, thus permitting increased ratio of maximum obtainable fuel flow to engine rotational speed so that there is a changeover to the maximum fuel flow lines O A₀ (Max), O A₂₀ (Max) and O A₄₀ (Max). For the three altitudes mentioned the maximum obtainable fuel flow i. e. the actual fuel flow during transient acceleration conditions, are shown by the curves O B₀ A₀, O B₂₀ A₂₀, O B₄₀ A₄₀. With such an arrangement, the changeover is effected at a R. P. M. which increases with altitude as indicated by N₀, N₂₀, N₄₀.

In other variants of the invention, the changeover may be effected when a predetermined compression ratio is passed through or when a predetermined absolute compressor discharge pressure is attained or when a predetermined compressor pressure rise is attained. A portion of a fuel system in which changeover can be effected at such times is illustrated in Figure 8.

Figure 8 shows a gas-turbine engine comprising a compressor 400, combustion equipment 401 and a turbine 402 having a rotor 403 driving the compressor. The fuel supplied to the engine is metered in a device as described with reference to Figure 1 which includes the throttle valve 142. The setting of the throttle valve 142 is determined by the flexible diaphragm 143, subjected to the pressure difference across a variable restriction 472 in the discharge conduit 426 of a constant volume pump 422 driven at a speed proportional to the speed of the turbine. This pressure difference loads the diaphragm 143 against the action of a spring 487.

In this embodiment, the maximum area to which the throttle valve 142 can be opened, is limited when the compression ratio or compressor discharge pressure is below a selected value, by interengagement of the stop 410 and co-operating abutment 411. The stop 410 is carried on a rod 412 which passes through and is engaged with a diaphragm 413, to have sliding engagement with the lever 446. The diaphragm 413 is subjected to the pressure difference across the variable restriction 472, is of the same area as the diaphragm 143, and is loaded by the spring 422 which is of the same rate as and applies the same load as the spring 487. Thus it will be seen that when the stop 410 and co-operating abutment 411 are engaged, the loads on the rod 412 from the abutment 411 are balanced by the loads on it from the diaphragm 413, and the position of the stop 410 is dependent solely on the position of the lever 446.

The lever 446 pivots about a fixed fulcrum 445 and has two evacuated capsules 420, 421 pivotally connected to it, one on either side of the fulcrum.

The capsule 421 is contained in a chamber 417 which is connected, through a pressure tapping 490, with the discharge of the compressor 400.

The capsule 420 is contained in a chamber 418 which, in the figure, is connected through pressure tapping 489, and pressure tapping 491, to the inlet of the compressor 400.

The lever 446 is free to rotate about its fulcrum 445 between two adjustable stops 415, 416, and it will be seen that, the lever 446 will be urged anti-clockwise by the pressure acting on the capsule 420 until the compression ratio attains a selected value dependent on the ratio of the distance along the lever arm between the fulcrum and the connection to capsule 420, and between the fulcrum and the connection to capsule 421 respectively. At this value the moment applied to the lever by the capsule 421 balances that applied to it by the capsule 420. On increase of compression ratio, the lever 446 will move from the stop 415 towards the stop 416.

It will be appreciated that if only the evacuated capsule 421 is employed in chamber 417, the lever 446 will move from the stop 415 when the absolute discharge pressure of the compressor 400 reaches a first selected value and will come up against the stop 416 when it reaches a second greater selected value dependent on the rate of the capsule 421.

Thus, since the stop 410 moves with the lever 446, the throttle valve will be limited in opening movement to a first position, until the compression ratio or discharge pressure reaches a selected value and will thereafter be able to open to greater extent as the lever 446 moves from the stop 415.

Another embodiment by means of which a changeover may be effected when a predetermined compressor pressure rise is passed through will be described with reference to Figure 2A. In this embodiment, the pipe lines 139A and 189B are omitted. Chamber 217 is connected to the discharge pressure of the compressor and chamber 218 is connected to the inlet pressure of the compressor. It will thus be seen that the diaphragm 214 is loaded by a pressure proportional to the difference between the compressor delivery pressure and the compressor inlet pressure, in opposition to the load of the spring 219. The remainder of the system is exactly as described with relation to Figure 2A.

In operation, when the compressor pressure rise exceeds the selected value, the load on the diaphragm 214 due to the difference between the compressor delivery pressure and the compressor inlet pressure overcomes the load due to the spring 219 and moves the stop 210 to the right in the figure, thus increasing the maximum area to which the throttle valve 142 may be opened. When the stop 210 and the co-operating abutment 211 are engaged, the loads on the rod 212 due to the diaphragm 143 are balanced by those transmitted to the rod by the diaphragm 213, and the position of the stop 210 is dependent solely on the position of the diaphragm 214.

In addition, the fuel system may incorporate a temperature control system of known or convenient kind, the function of such temperature control system being to ensure that the temperature of gases flowing through the turbine system does not exceed a predetermined value. For example, a temperature sensitive element such as a thermocouple or resistance thermometer situated in the exhaust duct of the engine may provide an output when a selected temperature is exceeded, which output is amplified through a suitable electronic amplifier to actuate a fuel control means reducing the supply of fuel to the engine. In applying such a system to the arrangement described with reference to Figure 1, the output from the amplifier may be used as shown in Figure 9 to close an auxiliary throttle 235 when a predetermined temperature is reached. An auxiliary throttle 235 located in the position indicated modifies the variable restriction 172, which has additionally a relief valve bypassing flow past it to avoid excessive pressure drop arising when the restriction is closed by rapid movement of the control lever 174.

Figure 9 also illustrates a restriction 125A equivalent to the fixed restriction 125 in the system of Figure 1, having an associated ambient temperature control capsule 236. The purpose of this capsule is to modify the pressure drop across the restriction 125 in accordance with the ambient temperature, by increasing the area of the restriction with reduction of temperature and vice-versa. This pressure drop operating on the diaphragm 129 defines the pressure differential between chamber 136 and delivery pipeline 139, so that with reduced temperature this pressure drop is increased thus increasing the fuel flow to the engine. In combination with the pressure capsule 158 the ambient temperature capsule 236 controls the fuel flow correctly in accordance with the density of the ambient atmosphere or compressor intake air, where the capsules are arranged to sense pressure and temperature at the air intake.

The systems described in relation to Figures 1 and 2 are very suitable for use with gas-turbine engines for aircraft propulsion in which propulsive thrust is derived from the high exit velocity of an exhaust gas stream, the rotational speed of a compressor and turbine rotor assembly being determined by the fuel supply to the engine. The invention is also applicable to gas-turbine engines in which external shaft power is derived, and utilized for example in driving an airscrew or ducted fan. In such cases it is preferably arranged that the load imposed by the airscrew is adjusted by means of a temperature control system such as outlined above, to avoid excessive temperature arising in the turbine.

In the above description and in the appended claims, it is to be understood that a diaphragm may be replaced by a piston tight in a cylinder or by a bellows and the word "diaphragm" should be read to include a piston or the end-wall of a bellows.

We claim:

1. For use in a throttle-valve controlled fuel-supply system in gas-turbine engines, a stop co-operating with such system which stop forms a restraint on the degree of opening movement of the valve and is adjustable relative to the valve, a constant volume pump driven by the engine at a speed proportional to that of the engine, a discharge-conduit from said pump, a fixed restriction in said conduit, a motor for adjusting said stop comprising a movable diaphragm and chambers to opposite sides of said diaphragm in communication separately with said discharge conduit at opposite sides of said restriction whereby the diaphragm is sensitive to the pressure drop across said restriction with the high pressure side of the restriction acting to influence the diaphragm in moving the stop to diminish the restraint on the opening movement of said valve, and a loading device for loading said diaphragm with a selected load biasing the diaphragm to an opposite movement in which said stop is adjusted to a position of greater restraint on the degree of opening movement of the valve.

2. A gas-turbine engine having a rotor and a fuel-supply system; a conduit in said system; a throttle valve for controlling the fuel flow through said conduit; a stop movable relative to said throttle valve into and out of a position, and operative at least in said position, to limit the opening movement of said throttle valve; means sensitive to a selected value of an operating variable which is dependent at least in part on the speed of the engine and including a member which moves through a given location when said selected value is passed through, and an operative connection between said member and said stop whereby said stop is moved from said position when said member passes through said given location due to increase of speed, and is moved to said position when said member passes through said given location due to decrease of speed.

3. A gas-turbine engine having a rotor and a fuel-supply system; a conduit in said system; a throttle valve for controlling the fuel flow through said conduit; a stop movable relative to said throttle valve into and out of a position and operative at least in said position to limit the opening movement of said throttle valve; means sensitive to a selected value of the speed of said rotor; and including a member which moves through a given location when said selected value is passed through, and an operative connection between said member and said stop whereby said stop is moved from said position when said member passes through said given location due to increase of speed, and is moved to said position when said member passes through said given location due to decrease of speed.

4. A gas-turbine engine having a compressor, a rotor, and a fuel-supply system; a conduit in said system; a throttle valve for controlling the fuel flow through said conduit; a stop movable relative to said throttle valve into and out of a position and operative at least in said position to limit the opening movement of said throttle valve; means sensitive to a selected value of the pressure ratio between the intake and delivery of said compressor; and including a member which moves through a given location when said selected value is passed through, and an operative connection between said member and said stop whereby said stop is moved from said position when said member passes through said given location due to increase of said pressure ratio, and is moved to said position when said member passes through said given location due to decrease of said pressure ratio.

5. A gas-turbine engine having a compressor, a rotor, and a fuel-supply system; a conduit in said system; a throttle valve for controlling the fuel flow through said conduit; a stop movable relative to said throttle valve into and out of a position, and operative at least in said position to limit the opening movement of said throttle valve; means sensitive to a selected value of the absolute delivery pressure of said compressor; and including a member which moves through a given location when said selected value is passed through, and an operative connection between said member and said stop whereby said stop is moved from said position when said member passes through said given location due to increase of said absolute delivery pressure, and is moved to said position when said member passes through said given location due to decrease of said absolute delivery pressure.

6. A gas-turbine engine having a compressor, a rotor, and a fuel-supply system, a conduit in said system; a throttle valve for controlling the fuel flow through said conduit; a stop movable relative to said throttle valve into and out of a position, and operative at least in said position to limit the opening movement of said throttle valve; means sensitive to a selected value of the pressure rise of said compressor, and including a member which moves through a given location when said selected value is passed through, and an operative connection between said member and said stop whereby said stop is moved from said position when said member passes through said given location due to increase of said pressure rise, and is moved to said position when said member passes through said given location due to decrease of said pressure rise.

7. A gas-turbine engine having a rotor and a fuel-supply system; a conduit in said system; a throttle valve for controlling the fuel flow through said conduit; a stop movable relative to said throttle valve into and out of a position and operative at least in said position to limit the opening movement of said throttle valve; means sensitive to a selected value of the actual fuel flow to the engine; and including a member which moves through a given location when said selected value is passed through, and an operative connection between said member and said stop whereby said stop is moved from said position when said member passes through said given location due to increase of said actual fuel flow, and is moved to said position when said member passes through said given location due to decrease of said actual fuel flow.

8. A gas-turbine engine having a rotor and a fuel-supply system; a conduit in said system; a throttle valve for controlling the fuel flow through said conduit; a stop movable relative to said throttle valve into and out of a position and operative at least in said position to limit the opening movement of said throttle valve; a constant volume pump; a driving connection between said pump and said rotor, whereby said pump is driven at a speed proportional to that of said rotor; a discharge-conduit from said pump; a fixed restriction in said discharge-conduit; a first chamber; a second chamber; a flexible diaphragm dividing said first chamber from said second chamber and connected to said stop; a first pressure tapping from said discharge-conduit upstream of said fixed restriction to said first chamber and a second pressure tapping from said discharge-conduit downstream of said fixed restriction to said second chamber whereby said diaphragm is loaded by a resultant pressure load proportional to the pressure drop across said fixed restriction; and a loading device arranged to load said diaphragm with a selected load towards said first chamber; whereby said stop moves out of said position when said resultant pressure load exceeds said selected load and into said position when the resultant pressure load falls below said selected load.

9. A gas-turbine engine having a rotor and a fuel-supply system; a conduit in said system; a throttle valve for controlling the fuel flow through said conduit; a stop movable relative to said throttle valve into and out of a position and operative at least in said position to limit the opening movement of said throttle valve; a constant volume pump; a driving connection between said pump and said rotor, whereby said pump is driven at a speed proportional to that of said rotor; a discharge-conduit from said pump; a fixed restriction in said discharge-conduit; a first chamber; a second chamber; a flexible diaphragm dividing said first chamber from said second chamber and connected to said stop; a first pressure tapping from said discharge-conduit upstream of said fixed restriction to said first chamber and a second pressure tapping from said discharge-conduit downstream of said first restriction to said second chamber whereby said diaphragm is loaded by a resultant pressure load proportional to the pressure drop across said fixed restriction; and a loading device arranged to load said diaphragm with a selected load towards said first chamber; whereby said stop moves out of said position when said resultant pressure load exceeds said selected load and into said position when the resultant pressure load falls below said selected load, and whereby the opening load applied to said throttle valve is transmitted to said diaphragm; and means to apply to said diaphragm a load equal in magnitude and opposite in direction to said opening load.

10. A gas-turbine engine having a rotor and a fuel-supply system; a conduit in said system; a throttle valve for controlling the fuel flow through said conduit; a stop movable relative to said throttle valve into and out of a position and operative at least in said position to limit the opening movement of said throttle valve; a supply-conduit in said system located to pass the actual fuel supplied to the engine; a fixed restriction in said supply-conduit; a first chamber; a second chamber; a flexible diaphragm dividing said first chamber from said second chamber and connected to said stop; a first pressure tapping from said supply-conduit upstream of said fixed restriction to said first chamber and a second pressure tapping from said supply-conduit downstream of said fixed restriction to said second chamber whereby said diaphragm is loaded by a resultant pressure load proportional to the pressure drop across said fixed restriction; and a loading device arranged to load said diaphragm with a selected load towards said first chamber; whereby said stop moves out of said position when said resultant pressure load exceeds said selected load and into said position when the resultant pressure load falls below said selected load.

11. A gas-turbine engine having a rotor and a fuel-supply system; a conduit in said system; a throttle valve for controlling the fuel flow through said conduit; a stop movable relative to said throttle valve into and out of a position and operative at least in said position to limit the opening movement of said throttle valve; a supply-conduit in said system located to pass the actual fuel supplied to the engine; a fixed restriction in said supply-conduit; a first chamber; a second chamber; a flexible diaphragm dividing said first chamber from said second chamber and connected to said stop; a first pressure tapping from said supply-conduit upstream of said fixed restriction to said first chamber and a second pressure tapping from said supply-conduit downstream of said fixed restriction to said second chamber whereby said diaphragm is loaded by a resultant pressure load proportional to the pressure drop across said fixed restriction; and a loading device arranged to load said diaphragm with a selected load towards said first chamber; whereby said stop moves out of said position when said resultant pressure load exceeds said selected load and into said position when the resultant pressure load falls below said selected load, and whereby the opening load applied to said throttle is transmitted to said diaphragm; and means to apply to said diaphragm a load equal in magnitude and opposite in direction to said opening load.

12. A gas-turbine engine having a compressor, and a fuel-supply system; a conduit in said system; a throttle valve for controlling the fuel flow through said conduit; a stop movable relative to said throttle valve into and out of a position and operative at least in said position to limit the opening movement of said throttle valve; a first chamber; an evacuated second chamber; a flexible diaphragm dividing said first chamber from said second chamber and connected to said stop; a pressure-tapping from the discharge of said compressor to said first chamber whereby said diaphragm is loaded by a resultant pressure load proportional to the absolute discharge pressure of said compressor; and a loading device arranged to load said diaphragm with a selected load towards said first chamber; whereby said stop moves out of said position when said resultant pressure load exceeds said selected load and into said position when the resultant pressure load falls below said selected load.

13. A gas-turbine engine having a compressor, and a fuel-supply system; a conduit in said system; a throttle valve for controlling the fuel flow through said conduit; a stop movable relative to said throttle valve into and out of a position and operative at least in said position to limit the opening movement of said throttle valve; a first chamber; an evacuated second chamber; a flexible diaphragm dividing said first chamber from said second chamber and connected to said stop; a pressure-tapping from the discharge of said compressor to said first chamber whereby said diaphragm is loaded by a resultant pressure load proportional to the absolute discharge pressure of said compressor; and a loading device arranged to load said diaphragm with a selected load towards said first chamber; whereby said stop moves out of said position when said resultant pressure load exceeds said selected load and into said position when the resultant pressure load falls below said selected load, and to transmit to said diaphragm the opening load applied to said throttle; and means to apply to said diaphragm a load equal in magnitude and opposite in direction to said opening load.

14. A gas-turbine engine having a rotor and a fuel-supply system; a conduit in said system; a throttle valve for controlling the fuel flow through said conduit; a constant volume pump; a driving connection between said pump and said rotor, whereby said pump is driven at a speed proportional to that of said rotor; a discharge-conduit from said pump; a variable restriction in said discharge-conduit; a fixed restriction in said discharge conduit between said variable restriction and said constant volume pump; a first chamber, a second chamber and a first flexible diaphragm dividing said first chamber from said second chamber; a third chamber; a second flexible diaphragm, of the same area as and coaxial with said first diaphragm, dividing said second chamber from said third chamber and connected to said throttle valve; pressure tappings from said discharge-conduit upstream of said fixed restriction to said first chamber, from said discharge conduit downstream of said variable restrictive to said second chamber, and from said discharge conduit between said fixed restriction and said variable restriction to said third chamber, whereby said first diaphragm is loaded by a first resultant pressure load proportional to the pressure drop across both said restrictions and said second diaphragm is loaded by a second resultant pressure load proportional to the pressure drop across said variable restriction, said second diaphragm being connected to said throttle valve so that increase of said second resultant pressure load closes said throttle valve; a stop in said second chamber carried by said first diaphragm; a loading device loading said first diaphragm with a selected load towards said first chamber; a resilient loading device abutting between said first and second diaphragms; and a co-operating abutment carried by said second diaphragm and arranged to engage with said stop and to become disengaged therefrom by movement of said stop as a result of increase in said first resultant pressure load to a first preselected value greater than said selected load, and to be engaged therewith when said first resultant pressure load is less than said selected load and said second resultant pressure load is less than a second preselected value.

15. A gas-turbine engine as claimed in claim 14 further comprising means to maintain the pressure drop across said throtle valve proportional to the square of the speed of the rotor.

16. A gas-turbine engine having a rotor and a fuel-supply system; a conduit in said system; a throttle valve for controlling the fuel flow through said conduit; a constant volume pump; a driving connection between said pump and said rotor whereby said pump is driven at a speed proportional to that of said rotor; a discharge-conduit from said pump; a fixed restriction in said discharge-conduit; a variable restriction in said discharge-conduit between said fixed restriction and said constant volume pump; a first chamber, a second chamber and a first flexible diaphragm dividing said first chamber from said second chamber; a third chamber, a fourth chamber and a second flexible diaphragm, co-axial with and of the same effective area as said first diaphragm, dividing said third chamber from said fourth chamber; said second and third chambers being located between said first and second diaphragms; pressure tappings from said discharge-conduit upstream of said variable restriction to said first chamber and said fourth chamber, from said discharge-conduit downstream of said fixed restriction to said second chamber, and from said discharge conduit between said fixed restriction and said variable restriction to said third chamber whereby said first diaphragm is loaded by a first resultant pressure load proportional to the pressure drop across both said restrictions and said second diaphragm is loaded by a second resultant pressure load proportional to the pressure drop across said variable restriction; a stop carried by said first diaphragm and located between said first diaphragm and said second diaphragm; a loading device loading said first diaphragm with a selected load towards said first chamber; a first resilient loading device loading said first diaphragm with a first resilient load towards said first chamber; a second resilient loading device loading said second diaphragm towards said fourth chamber with a second resilient load equal to and of the same rate as said first resilient load; an operative connection between said second diaphragm and said throttle valve arranged so that movement of said second diaphragm, as a result of increase of said second resultant pressure load, closes said throttle valve; and a co-operating abutment carried by said second diaphragm and arranged to engage with said stop and to become disengaged therefrom by movement of said stop as a result of increase in said first resultant pressure load to a first preselected value greater than said selected load, and to be engaged therewith when said first resultant pressure load is less than said selected load and said second resultant pressure load is less than a second preselected value.

17. A gas-turbine engine having a rotor and a fuel-supply system; a conduit in said system; a throttle valve for controlling the fuel flow through said conduit; a driving connection between said pump and said rotor whereby said pump is driven at a speed proportional to that of said rotor; a discharge-conduit from said pump; a first fixed restriction in said discharge-conduit; a second fixed restriction in said discharge-conduit between said first fixed restriction and said constant volume pump; a first chamber, a second chamber and a first flexible diaphragm dividing said first chamber from said second chamber; a third chamber; a second flexible diaphragm of the same area as and coaxial with said first diaphragm, dividing said second chamber from said third chamber; pressure tappings from said discharge-conduit upstream of said second fixed restriction to said first chamber, from said discharge-conduit downstream of said first fixed restriction to said second chamber, and from said discharge conduit between said first fixed restriction and said second fixed restriction to said third chamber, whereby said first diaphragm is loaded with a first resultant pressure load proportional to the pressure drop across both said fixed restrictions and said second diaphragm is loaded with a second resultant pressure load proportional to the pressure drop across said first fixed restriction; a stop in said second chamber carried by said first diaphragm; a loading device loading said first diaphragm with a selected load towards said first chamber; a first spring loading said first diaphragm with a first resilient load towards said first chamber, and abutting a first movable abutment; a second spring equal to and of the same rate as said first spring loading said second diaphragm with a second resilient load towards said third chamber, and abutting a second movable abutment; means to move both said movable abutments simultaneously and equally so that said first and second resilient loads are adjustable but maintained equal; an operative connection between said second diaphragm and said throttle valve arranged so that movement of said second diaphragm, as a result of increase of said second resultant pressure load, closes said throttle valve; and a co-operating abutment carried by said second diaphragm and arranged to engage with said stop and to become disengaged therefrom by movement of said stop as a result of increase in said first resultant pressure load to a first preselected value greater than said selected load, and to be engaged therewith when said first resultant pressure load is less than said selected load and said second resultant pressure load is less than a second preselected value.

18. A gas-turbine engine having a compressor, a rotor, and a fuel-supply system; a conduit in said system; a throttle valve for controlling the fuel flow through said conduit; a constant volume pump; a driving connection between said pump and said rotor whereby said pump is driven at a speed proportional to that of said rotor; a discharge-conduit from said pump; a variable restriction in said discharge-conduit; a first chamber; a first evacuated capsule in said first chamber; a second chamber; a second evacuated capsule in said second chamber; a lever; a first rod carried for movement with the free end of said first evacuated capsule and pivotally connected to said lever; a second rod carried for movement with the free end of said second evacuated capsule and pivotally connected to said lever; a fixed fulcrum for said lever between the connections of said first rod and said second rod; a third chamber, a fourth chamber and a first flexible diaphragm dividing said third chamber from said fourth chamber; a fifth chamber, a sixth chamber and a second flexible diaphragm dividing said fifth chamber from said sixth chamber; pressure tappings from the discharge of said compressor to said first chamber, from the inlet of said compressor to said second chamber, from said discharge-conduit upstream of said variable restriction to said third chamber and said sixth chamber, and from said discharge-conduit downstream of said variable restriction to said fourth chamber and said fifth chamber; whereby said lever is loaded with a resultant pressure moment proportional to the compression ratio of said compressor, said first diaphragm is loaded with a first resultant pressure load proportional to the pressure drop across said variable restriction, and said second diaphragm is loaded with a second resultant pressure load proportional to the pressure drop across said variable restriction; a first operative connection interconnecting said lever and said first diaphragm; a stop carried for movement with said first diaphragm; a selected moment loading said lever in the same sense as pressure in said second chamber; a first resilient loading device loading said first diaphragm with a first resilient load towards said third chamber; a second resilient loading device loading said second diaphragm with a second resilient load towards said sixth chamber; a second operative connection interconnecting said second diaphragm and said throttle valve, and arranged so that movement of said second diaphragm due to increase in said second resultant pressure load closes said throttle valve; and a co-operating abutment connected with said second diaphragm and arranged to engage said stop and to become disengaged therefrom by movement of said stop as a result of increase of said resultant pressure moment to a first preselected value greater than said selected moment, and to be engaged therewith when said resultant pressure moment is less than said selected moment and said second resultant pressure load is less than a second preselected value; said third, fourth, fifth and sixth chambers and said first and second operative connections being so arranged, and said first and second diaphragms and said first and second resilient loads being so dimensioned that, when said stop and said co-operating abutment are engaged, said first and second resultant pressure loads and said first and second resilient loads balance each other, the position of said stop being determined solely by said resultant pressure moment and said selected moment.

19. In a fuel system for gas turbine engines and the like having fuel injectors and a fuel supply conduit to the fuel injectors, a valve member in said conduit, normally-operative control means to move said valve member to control the supply of fuel to the injectors, abutment means rigidly connected to said valve member to move therewith, a stop adjustable independently of said valve member and including normally disengaged cooperating abutment means to engage the first said abutment means to define the limit of normal movement of said valve member in the sense of increasing the flow of fuel, and adjusting means responsive solely to an operating variable which is at least in part dependent on the speed of the engine, the adjusting means being rigidly connected to said stop, whereby the position of the stop is dependent solely on the value of said variable when said cooperating abutment means is in engagement with the first said abutment means.

20. In a fuel system for gas turbine engines and the like having fuel injectors and a fuel supply conduit to the fuel injectors, a valve member in said conduit, normally-operative control means to move said valve member to control the supply of fuel through the injectors, abutment means connected to said valve member, an adjustable stop including co-operating abutment means to engage the first said abutment means, fluid-pressure-sensitive adjusting means connected to said stop and subjected to a pressure difference dependent on an operating variable which is at least in part dependent on the speed of the engine, and resilient means to load said adjusting means in opposition to said fluid pressure, whereby the position of the stop is adjusted when the value of said operating variable varies.

21. In a fuel system for gas turbine engines and the like having fuel injectors and a fuel supply conduit to the fuel injectors, a valve member in said conduit, normally-operative control means to move said valve member to control the supply of fuel to the injectors, abutment means rigidly connected to said valve member to move therewith, a stop adjustable independent of said valve member and including normally disengaged cooperating abutment means to engage the first said abutment means to define the limit of normal movement of said valve member in the sense of increasing the flow of fuel, and speed-responsive adjusting means rigidly connected to said stop, whereby the position of the stop is dependent on the speed of the engine when said cooperating abutment means is in engagement with the first said abutment means.

22. In a fuel system for gas turbine engines and the like having fuel injectors and a fuel supply conduit to the fuel injectors, a valve member in said conduit, normally-operative speed governor control means to move said valve member to control the supply of fuel to the injectors, abutment means connected to said valve member, an adjustable stop including co-operating abutment means to engage the first said abutment means to define the limit of said normal movement in the sense of increasing the flow of fuel, fluid-pressure-sensitive adjusting means connected to said stop and subjected to a pressure difference dependent solely on an operating variable which is at least in part dependent on the speed of the engine, and resilient means connected to said adjusting means to oppose said fluid pressure, whereby the position of the stop is adjusted when a selected value of said operating variable is passed through.

23. For use in a throttle-valve-controlled fuel-supply system in gas turbine engines, normally-operative control means to move said throttle valve to control the supply of fuel to the engine, abutment means rigidly connected to said throttle valve to move therewith, a stop adjustable independently of said valve member and including normally disengaged cooperating abutment means to engage the first said abutment means to define the limit of normal movement of said valve member in the sense of increasing the flow of fuel, and adjusting means rigidly connected to said stop and responsive solely to an operating variable which is at least in part dependent on the speed of the engine, whereby the position of the stop is dependent solely on the value of said variable when said cooperating abutment means is in engagement with the first said abutment means.

24. For use in a throttle-valve-controlled fuel-supply system in gas turbine engines, normally-operative control means to move said throttle valve, abutment means connected to said throttle valve, an adjustable stop including co-operating abutment means to engage the first said abutment means to define the limit of said normal movement in the sense of increasing the flow of fuel, operating - variable - responsive adjusting means connected to said stop to load it solely in dependence on an operating variable which is at least in part dependent on the speed of the engine, and pre-stressed resilient means to load said adjusting means in opposition to said operating-variable-responsive means, whereby the load due to the operating-variable-responsive means overcomes the prestressed resilient load and causes the stop to be adjusted to permit greater opening movement of the valve when said operating variable passes through a selected value during acceleration of the engine, and whereby return movement of the stop in the opposite direction is caused when said selected value is passed through during deceleration of the engine.

KENNETH ROY DAVIES.
KARL HERBSTRITT.

References Cited in the file of this patent

UNITED STATES PATENTS

| Number | Name | Date |
|---|---|---|
| 2,369,397 | Kostenick | Feb. 13, 1945 |
| 2,422,808 | Stokes | June 24, 1947 |
| 2,432,177 | Sédille | Dec. 9, 1947 |
| 2,474,033 | Chamberlin et al. | June 21, 1949 |
| 2,481,334 | Nicolls | Sept. 6, 1949 |
| 2,489,586 | Ray | Nov. 29, 1949 |
| 2,581,275 | Mock | Jan. 1, 1952 |

FOREIGN PATENTS

| Number | Country | Date |
|---|---|---|
| 429,682 | Great Britain | June 4, 1935 |
| 560,196 | Great Britain | Mar. 24, 1944 |